United States Patent
Evans et al.

(10) Patent No.: US 10,383,430 B2
(45) Date of Patent: Aug. 20, 2019

(54) RELEASABLE RETAINING CLIP APPARATUS AND METHOD OF USE

(71) Applicants: Scott Evans, Jacksonville, NC (US); Nicholas Tomczak, Jacksonville, NC (US)

(72) Inventors: Scott Evans, Jacksonville, NC (US); Nicholas Tomczak, Jacksonville, NC (US)

(73) Assignee: Edge-Works Manufacturing Company, Burgaw, NC (US)

( * ) Notice: Subject to any disclaimer, the term of this patent is extended or adjusted under 35 U.S.C. 154(b) by 18 days.

(21) Appl. No.: 15/481,393

(22) Filed: Apr. 6, 2017

(65) Prior Publication Data
US 2017/0290410 A1 Oct. 12, 2017

Related U.S. Application Data

(60) Provisional application No. 62/320,038, filed on Apr. 8, 2016.

(51) Int. Cl.
| | |
|---|---|
| A41F 5/00 | (2006.01) |
| A41F 9/00 | (2006.01) |
| F16B 2/22 | (2006.01) |
| A45F 5/02 | (2006.01) |

(52) U.S. Cl.
CPC ............... *A45F 5/021* (2013.01); *A41F 9/00* (2013.01); *F16B 2/22* (2013.01)

(58) Field of Classification Search
CPC ............... A41F 9/00; A45F 5/021; F16B 2/22
See application file for complete search history.

(56) References Cited

U.S. PATENT DOCUMENTS

| | | | | |
|---|---|---|---|---|
| 308,583 A * | 11/1884 | Unckrich | ............... | A41F 11/02 24/532 |
| 1,110,579 A * | 9/1914 | Seeber | ............... | A41F 11/02 24/537 |
| 3,100,324 A * | 8/1963 | Tutino | ............... | D06F 55/00 223/85 |
| 5,327,619 A * | 7/1994 | Ortega | ............... | A44B 11/266 24/616 |
| 5,388,313 A * | 2/1995 | Cameron | ............... | A41F 3/04 24/265 EC |
| 6,000,109 A * | 12/1999 | Anscher | ............... | A44B 11/263 24/614 |
| 6,282,802 B1 * | 9/2001 | Iden | ............... | G01C 17/04 33/347 |
| 6,698,071 B1 * | 3/2004 | Greer, Jr. | ............... | F16B 2/10 24/507 |
| 7,165,371 B2 * | 1/2007 | Yoyasu | ............... | B60R 13/04 24/292 |
| 8,104,652 B2 * | 1/2012 | Yeh | ............... | B62J 9/006 224/427 |

(Continued)

*Primary Examiner* — Robert Sandy
*Assistant Examiner* — David M Upchurch
(74) *Attorney, Agent, or Firm* — Christina Chamberlain; Stephen M. Kepper; Intellectual Property Consulting, LLC

(57) ABSTRACT

A clip for securing articles to a belt with a semi-flexible central tear drop shaped bend portion having opposite spaced apart ends; a first leg and a second leg comprised of a rigid or semi-rigid material and connected to the opposite spaced apart ends of the central portion and extending in a generally parallel relationship therefrom; and a locking collar member.

12 Claims, 13 Drawing Sheets

(56) References Cited

U.S. PATENT DOCUMENTS

| | | | | |
|---|---|---|---|---|
| 8,181,847 | B1* | 5/2012 | Erdie | B65D 43/021 |
| | | | | 229/102 |
| 8,336,173 | B2* | 12/2012 | Pontaoe | A44B 99/00 |
| | | | | 24/265 EC |
| 9,115,513 | B1* | 8/2015 | Cayouette | E05B 73/0005 |
| 2003/0233739 | A1* | 12/2003 | Coffey | A45C 13/20 |
| | | | | 24/302 |
| 2005/0257353 | A1* | 11/2005 | Rohrig | A45F 5/02 |
| | | | | 24/537 |
| 2016/0037899 | A1* | 2/2016 | Stevens | A45F 5/021 |
| | | | | 224/678 |

* cited by examiner

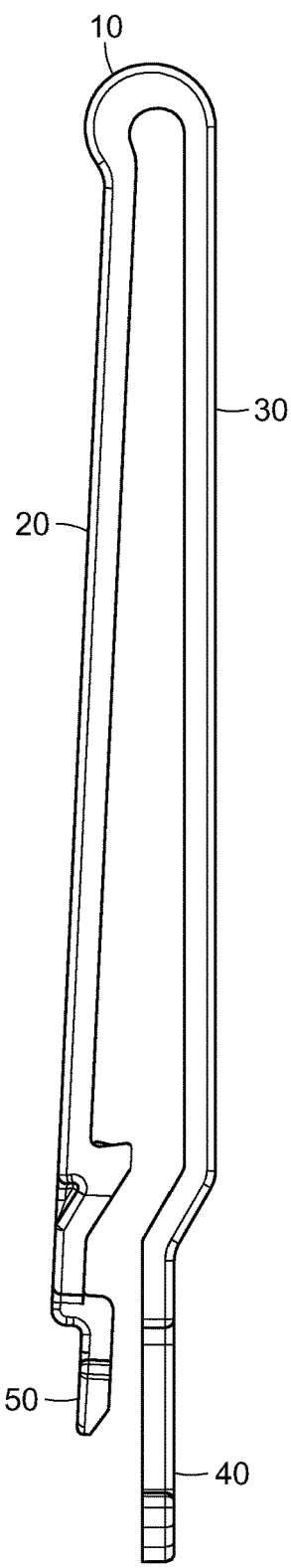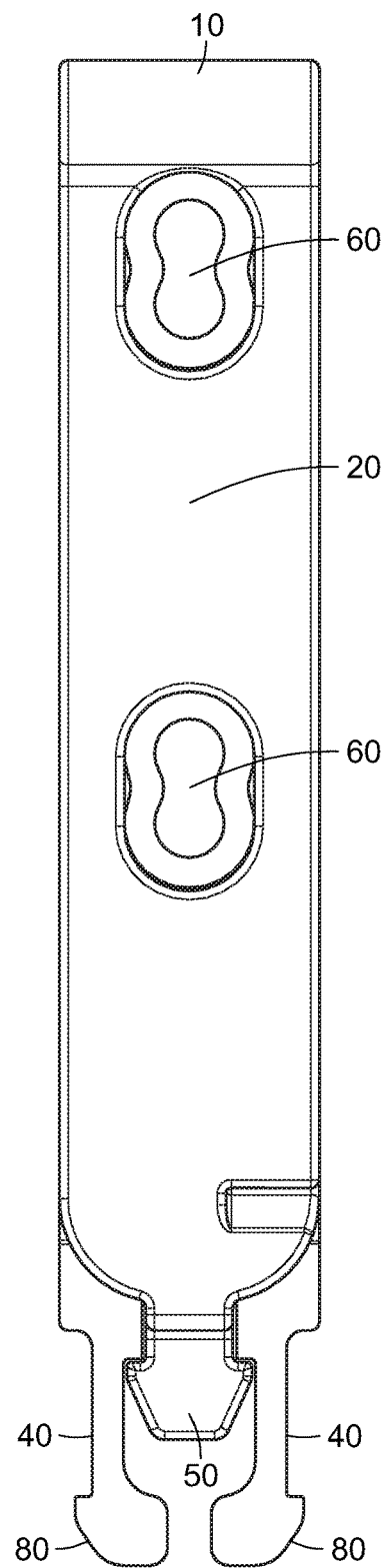

RELEASABLE RETAINING CLIP APPARATUS AND METHOD OF USE

RELATED APPLICATIONS

This application claims priority to U.S. Provisional Application No. 62/320,038 filed Apr. 8, 2016. The entire contents of the above application are hereby incorporated by reference as though fully set forth herein.

FIELD

This invention relates generally to straps and ties employed for binding securing and retaining articles together, and more particularly to releasable locking retaining clips employed for releasably securing articles to belts and the like.

BACKGROUND

Retaining clips, ties and like devices have long been provided to bind items together and are well known in the art. Generally, such clips and ties comprise a long strap member that forms a circular loop that connects back to itself, around one or more items to bind them together. They typically incorporate straps with a plurality of grooves for locking engagement with an integrally formed head. Nearly all such designs incorporate a substantially circular shaped loop, which is difficult to secure to a belt such that it lies flat against the user so as to not catch on other structures. While there are many types of straps that form a releaseable loop, many times a special tool is required to release the strap or the method of release is awkward and difficult to perform easily or with one hand only. Similarly, while there are releasable flat loop designs for binding pouches and similar items to a belt, they still use a method of release that is awkward and difficult to perform easily or with one hand only.

When most clips are attached to an item for carry, the clip is typically fed behind the belt and squeezed shut. However, most clips are not rigid and do not "bite" or grip the belt or vest so it doesn't slide laterally or vertically. As such, it fails to support the weight of the item that it carries. Straps made from flexible material and distort the shape if you pull on them and the item comes away from the belt or vest.

BRIEF SUMMARY OF THE INVENTION

As such, an object of the present invention is to releasably secure an article to a belt or similar restraint structure using a substantially flat loop and/or clip structure that is releasable, adjustable, reusable and quick and easy to fasten and unfasten. A further object of the present invention is to reduce slack in the clip when it is closed forming a retention structure when everything is closed and locked in order to hold two parts as close together as possible. The point where the material is folded against itself creates a tension structure with enough flexibility that the clip can be attached and detached but the rest of the clip is intended to be rigid so that when it is locked in a closed position there is no flexibility.

The present invention is a releasable retaining clip for retaining and securing a device to a person or another article, such as a belt. The present invention comprises generally a clip portion comprising (a) a single length of material bent upon itself approximately midway between its ends to provide a tear drop shaped bend from which extends an upper leg and lower leg having parallel overlying portions; (b) a plurality of longitudinal slats extending from the terminal end of the lower leg; (c) locking members extending along the sides at the terminal end of the longitudinal slats; and (d) at least one tab extending longitudinally from the terminal end of the upper leg. A locking collar with an upper and lower portion defines a passageway wherein the locking collar is slidably mounted over the plurality of longitudinal slats. A pivotable locking member extends outwards from the upper portion of the locking collar and inwards into the passageway. The upper and lower portions of the locking collar slide along the longitudinal slats of the lower leg to form a first open position, such that the upper leg may be moved away from the lower leg to engage an article to be secured, to a second closed position with the tab(s) extending from the upper leg into the passageway such that the tab(s) extending from the upper leg rests against the interior of the locking collar, thereby preventing movement of the upper leg away from the lower leg. The pivotable locking member of the locking collar and locking members of the clip also coordinate to lock the collar from reverse movement along the longitudinal slats of the lower leg in both the open and closed positions.

The upper and lower legs have a plurality apertures providing a plurality of mounting positions to mount a variety of items to the clip. For example, when the clip is attached to a belt, a variety of modular, lightweight, load-carry equipment (MOLLE) may be attached to the clip.

BRIEF DESCRIPTION OF THE DRAWINGS

FIG. 1 is a side view of the clip portion of the present invention with the clip portion in an open position FIG. 2 is a top view of the clip portion of the present invention with the clip portion in a closed position.

DETAILED DESCRIPTION

Figure 3:
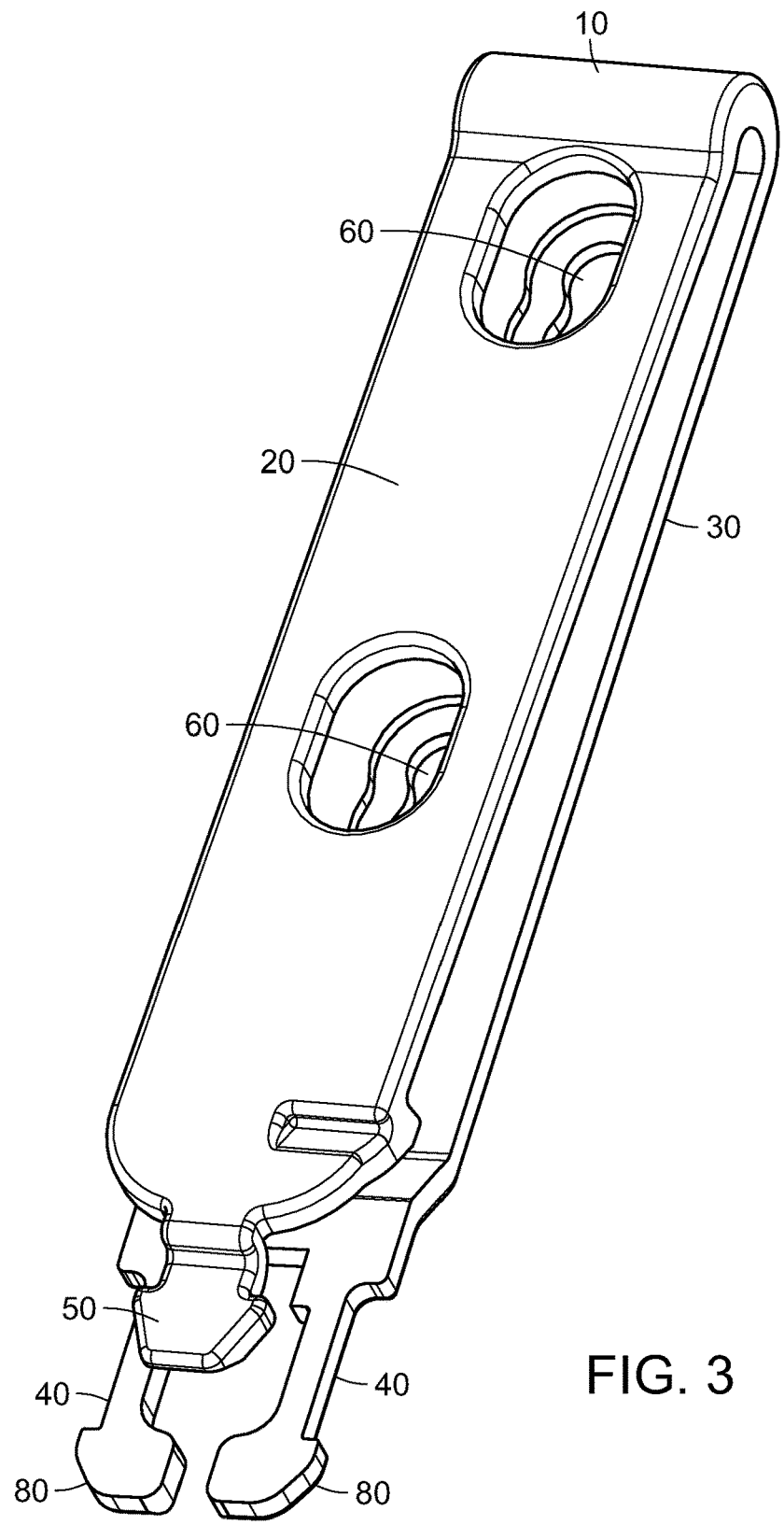
FIG. 3 is a side perspective view of the clip portion of the present invention with the clip portion in an open position.

Turning to FIG. 1, the clip portion has a single length of material bent upon itself approximately midway between its ends to provide a tear drop shaped bend 10, which reduces slack in the clip when it is closed creating a retention structure when everything is closed and locked in order to hold the upper leg 20 and lower leg 30 as close together as possible. The tear drop shaped bend 10 is created during the injection molding plastic process. During this process, by adding extra mass and adding a greater radius on the side of the bend connected to the upper leg changes the way the material shrinks and the rate at which it cools. The extra mass and greater radius add more strength by allowing the plastic to cool more slowly and shrink in such a manner that it moves the legs of the clip towards the closed configuration. A semi-circular bend with consistent wall thickness is traditionally used in prior art clips. When making the semi-circular bend using injection molding, as the plastic cools the clip tends to flex towards the open position whereas the extra mass used to create the tear drop bend the clip of the present invention flexes the legs of the clip towards the closed configuration. The bigger the radius of the bend of a clip, the stronger the bend point as the bend can take greater stresses/heavier loads. The only way to spread the load at the bend of a traditional semi-circular shaped bend is to increase the radius. The tear drop shape created by the present invention reduces bulkiness by allowing for a smaller radius at the bend yet still allows the clip to support larger load. Additionally, the bend helps to creates the necessary grip or bite between the two legs by biasing the clip legs towards one another.

The upper leg 20 and lower leg 30 have parallel overlying portions that create a sandwich type structure to envelop an article such as a belt or belt loop. FIG. 1 shows the clip in an open position where the upper leg 20 and lower leg 30 are spread to receive such an article. A plurality of longitudinal slats 40 extend from the lower leg 30. A tab 50 extending longitudinally from the upper leg 20.

The only way to spread the load of the clip at the bend of a clip is to increase the radius. The bigger the radius in the bend of the clip, the stronger the hinge point, allowing the clip to withstand greater stresses. The present invention reduces bulkiness associated with a larger radius in the bend yet still creates the bite between the two legs of the clip by adding mass during the injection molding process to allow for a tear drop shape to form at the bend.

Figure 4:
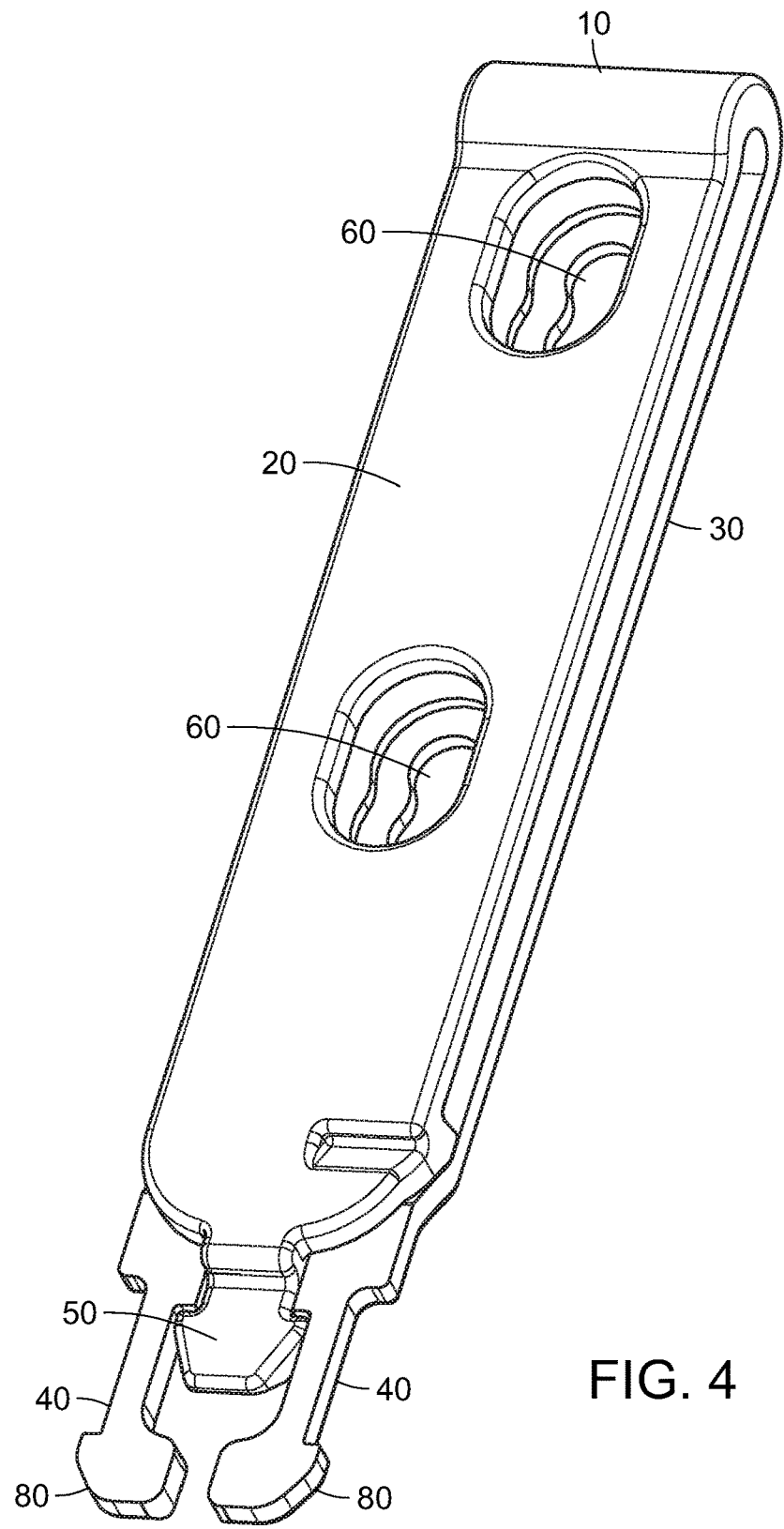
FIG. 4 is a side perspective view of the clip portion of the present invention with the clip portion in a closed position.
Figure 5:
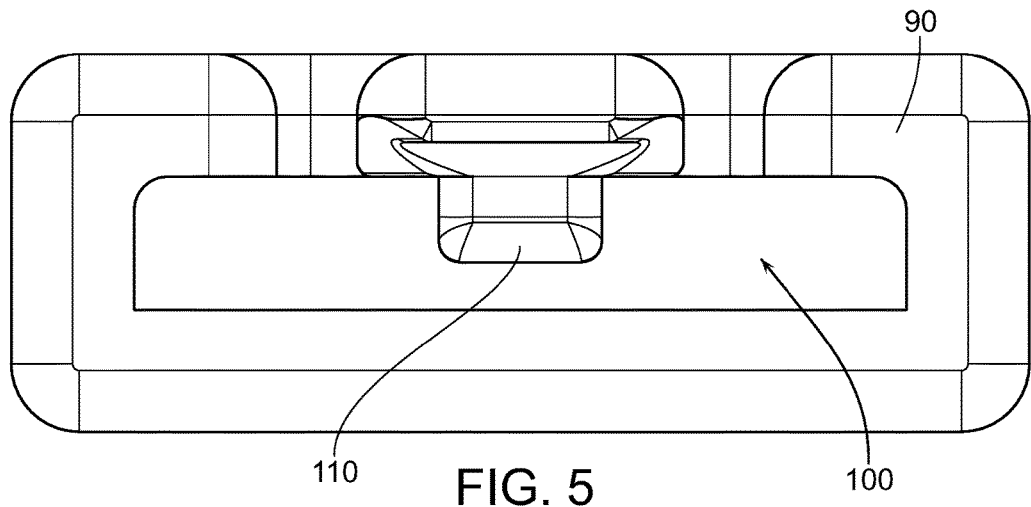
FIG. 5 is a front view of the locking collar portion of the present invention.
Figure 6:
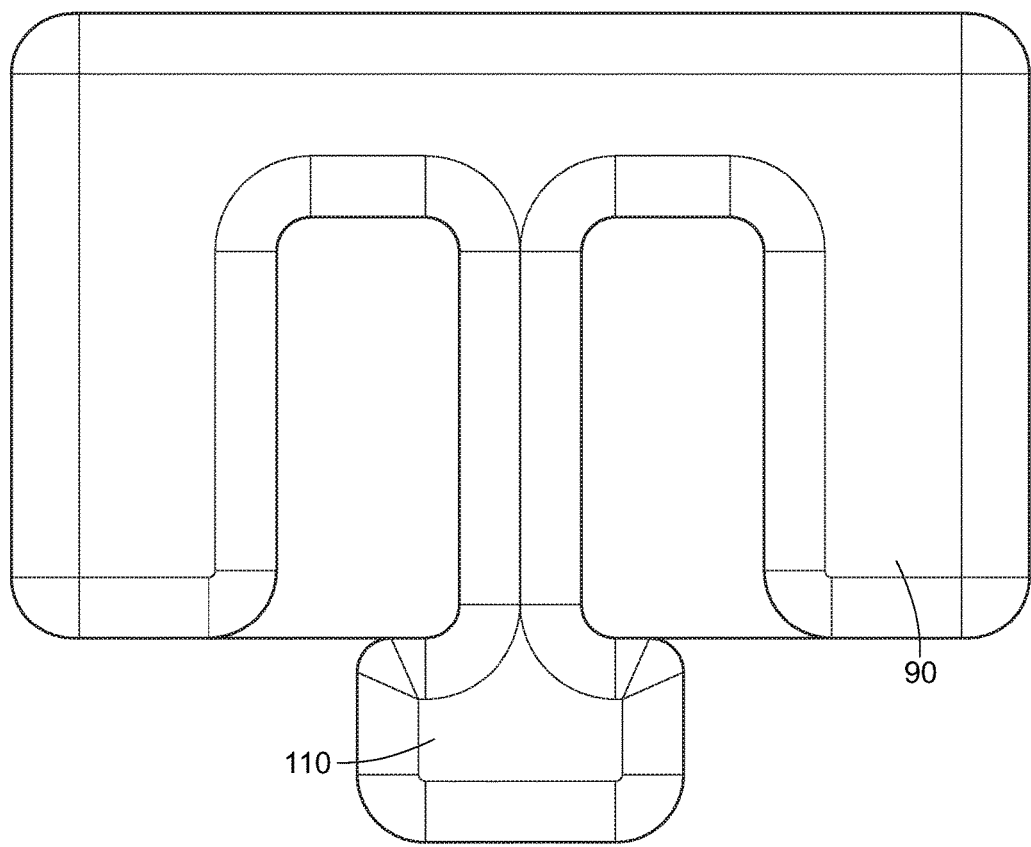
FIG. 6 is a top view of the locking collar portion of the present invention.
Figure 7:
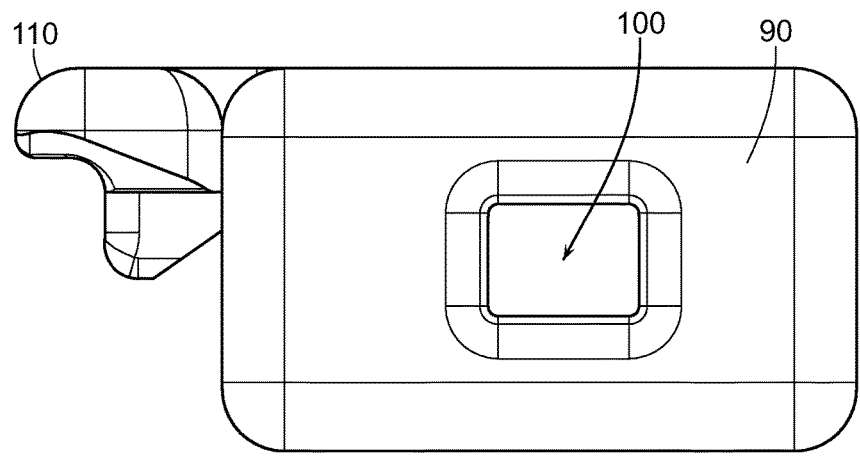
FIG. 7 is a side view of the locking collar portion of the present invention.
Figure 8:
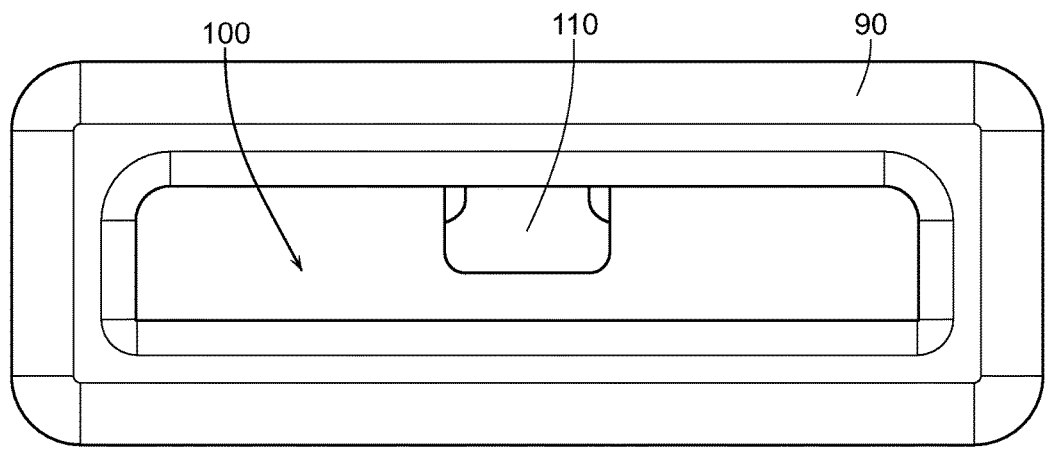
FIG. 8 is a rear view of the locking collar portion of the present invention.
Figure 9:
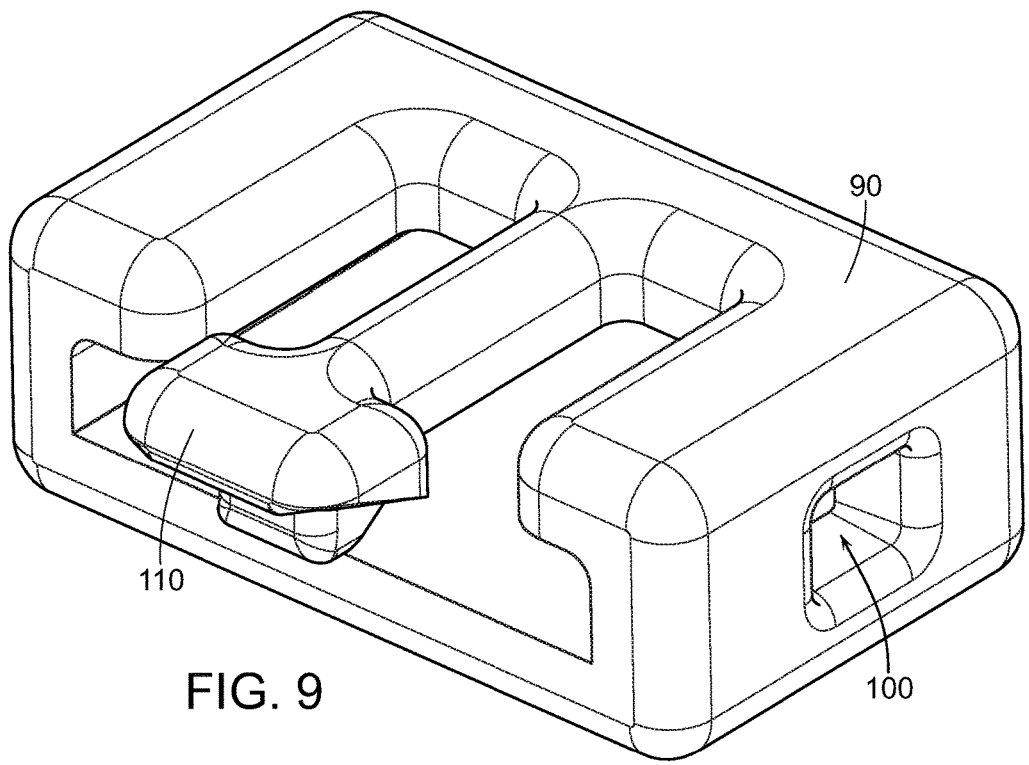
FIG. 9 is a top perspective view of the locking collar portion of the present invention.
Figure 10:
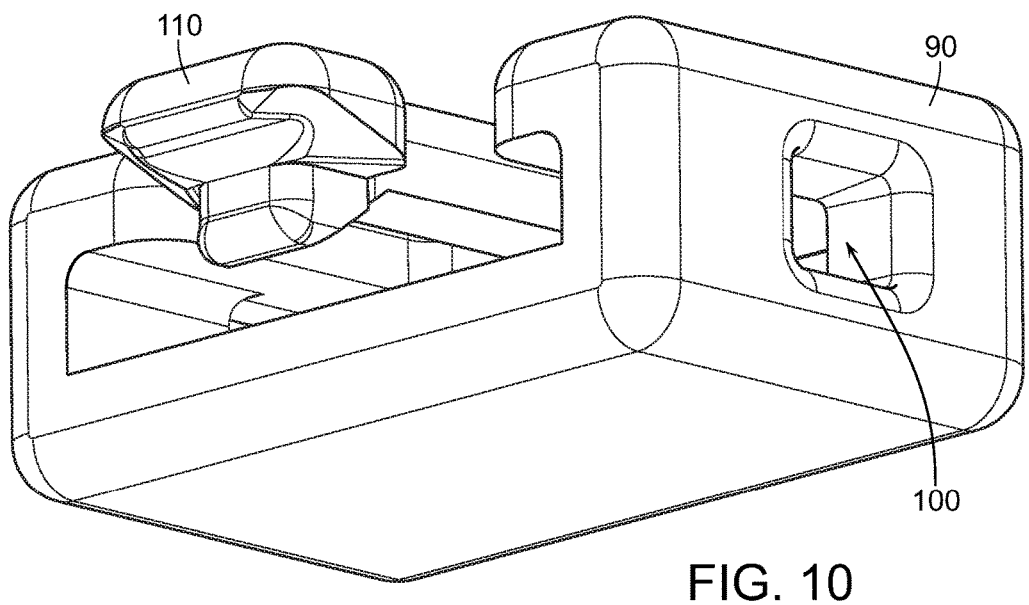
FIG. 10 is a bottom perspective view of the locking collar portion of the present invention.

Turning to FIG. 2, locking members 80 extend along the sides at the end of the longitudinal slats 40 distal to the lower leg 30. The upper and lower legs 20 and 30 have a plurality apertures providing a plurality of mounting positions 60 to mount a variety of items to the clip. FIG. 3 shows the clip portion in the open position wherein the upper leg 20 and lower leg 30 are separated from each other to allow an article to be sandwiched there between, such as a belt. FIG. 4 shows the clip portion in the closed position wherein the upper leg 20 and lower leg 30 abut against the article sandwiched there between, such as a belt.

Turning to FIGS. 5-10, various views show the locking collar 90 with an upper and lower portion defines a passageway 100. A pivotable locking member 110 extends outwards from the upper portion of the locking collar 90 and inwards into the passageway 100. When the upper leg 20 and lower leg 30 are in the closed position and is locked with the locking collar 90, the clip is rigid and bites or grips the belt/vest so it doesn't slide laterally or vertically; thereby supporting the weight of the item that the clip carries.

Figure 11:
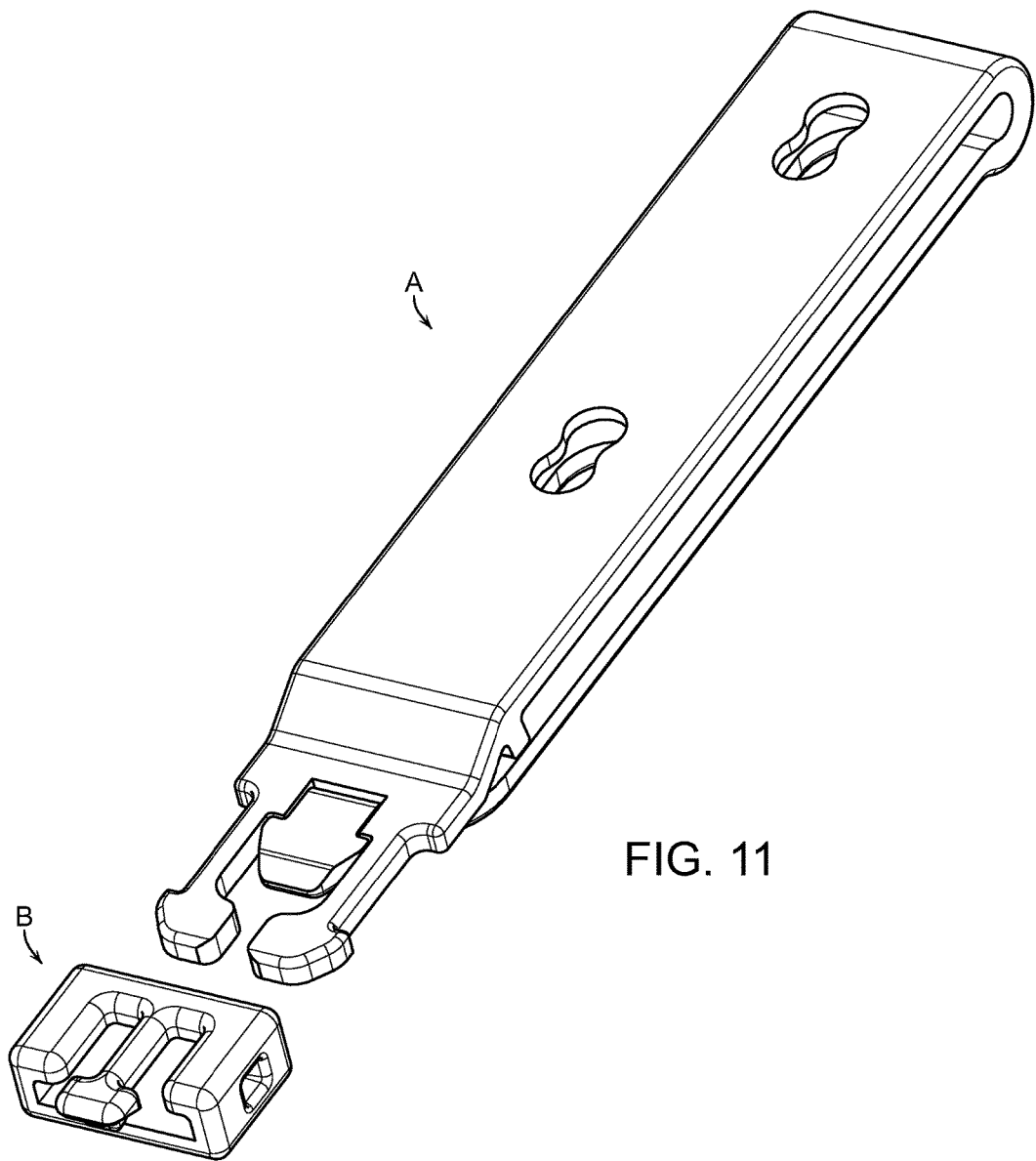
FIG. 11 is a top perspective view of the clip portion and locking collar portion prior to engagement.
Figure 12:
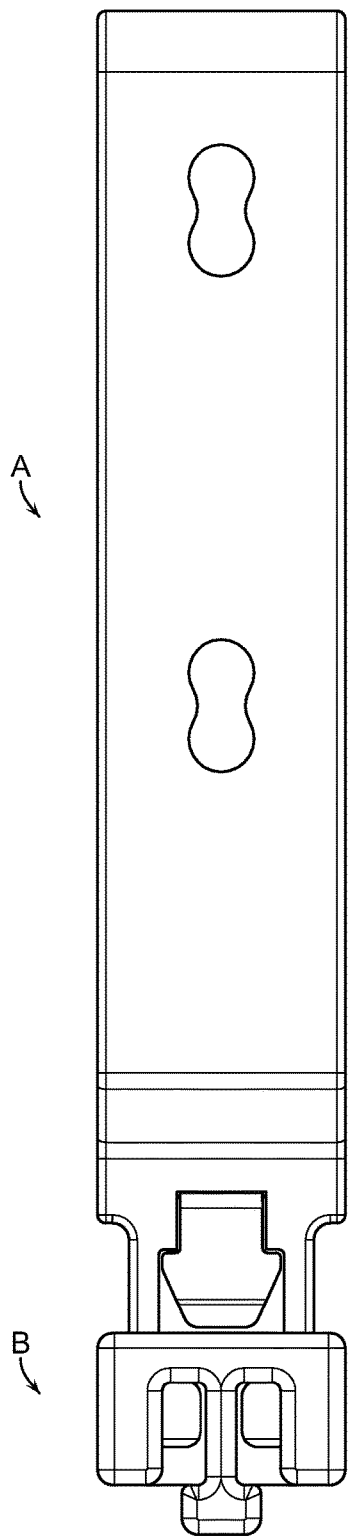
FIG. 12 is a top view of the clip portion and locking collar portion engaged in a locked position.
Figure 13:
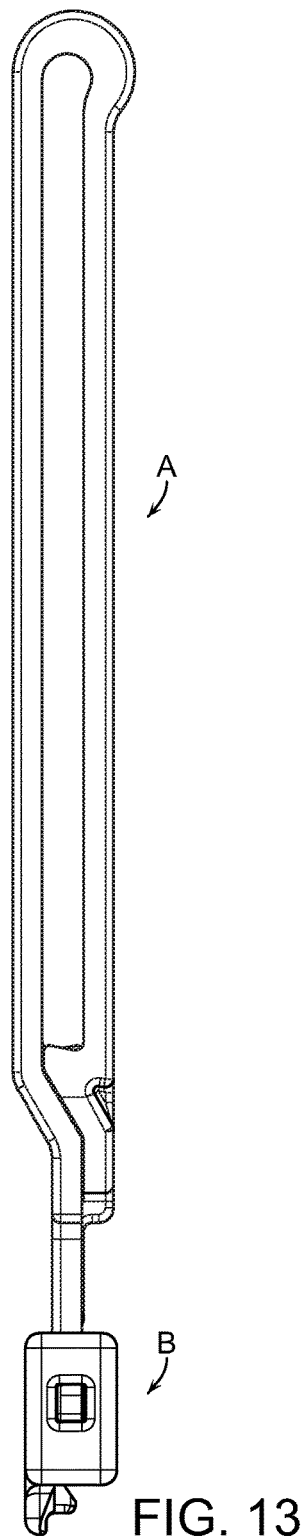
FIG. 13 is a side view of the clip portion and locking collar portion engaged in a locked position.
Figure 14:
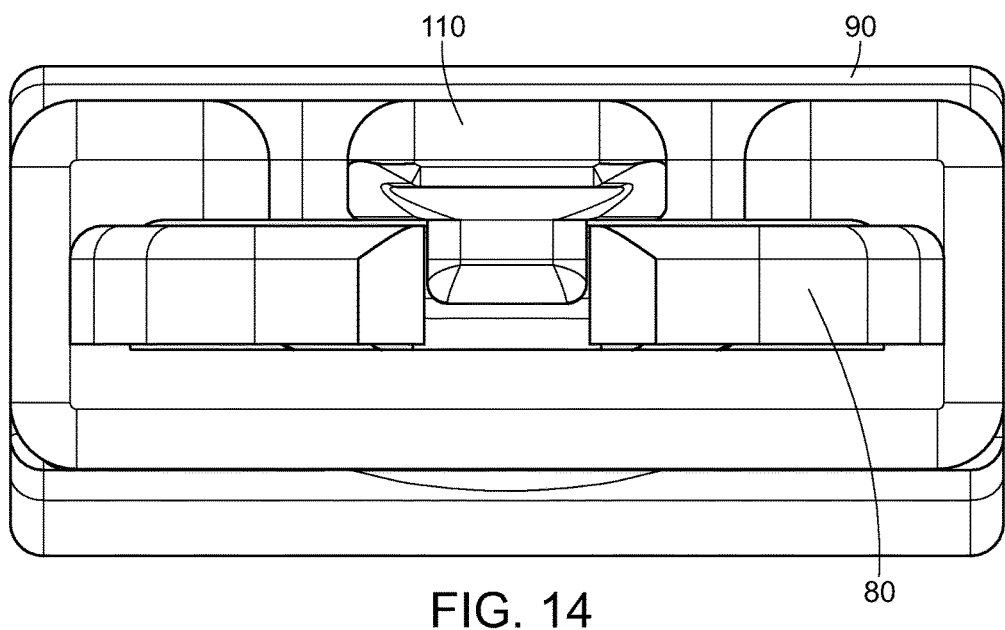
FIG. 14 is a front view of the clip portion and locking collar portion engaged in a locked.

Turning to FIG. 11, the clip portion A is shown prior to engagement with the locking collar B. In FIGS. 12-13, the locking collar B is engaged with the clip portion A. The locking mechanism of the locking collar B allows the clip portion A and collar portion B to remained joined even when the legs of the clip are in the open position. This ensures that the locking collar B is not lost when attaching or detaching to/from the belt.

Figure 15:
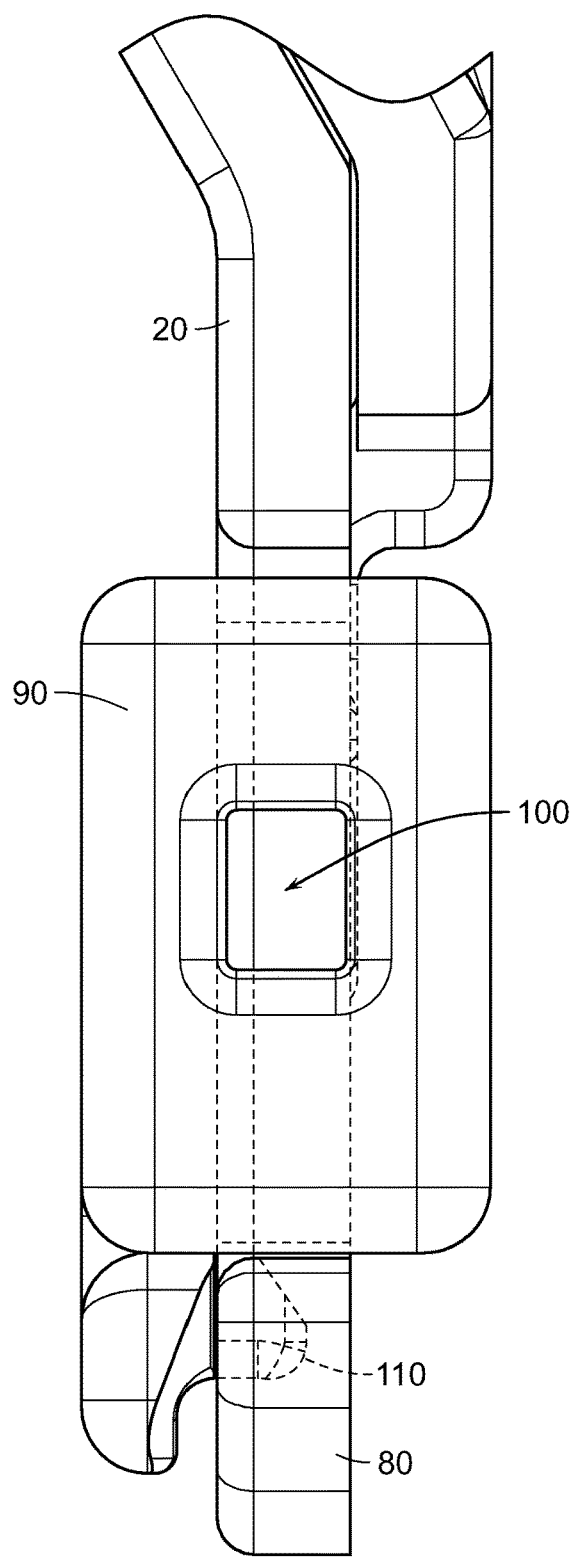
FIG. 15 is a side view of the clip portion and locking collar portion engaged in a locked position with the locking collar prominent.
Figure 16:
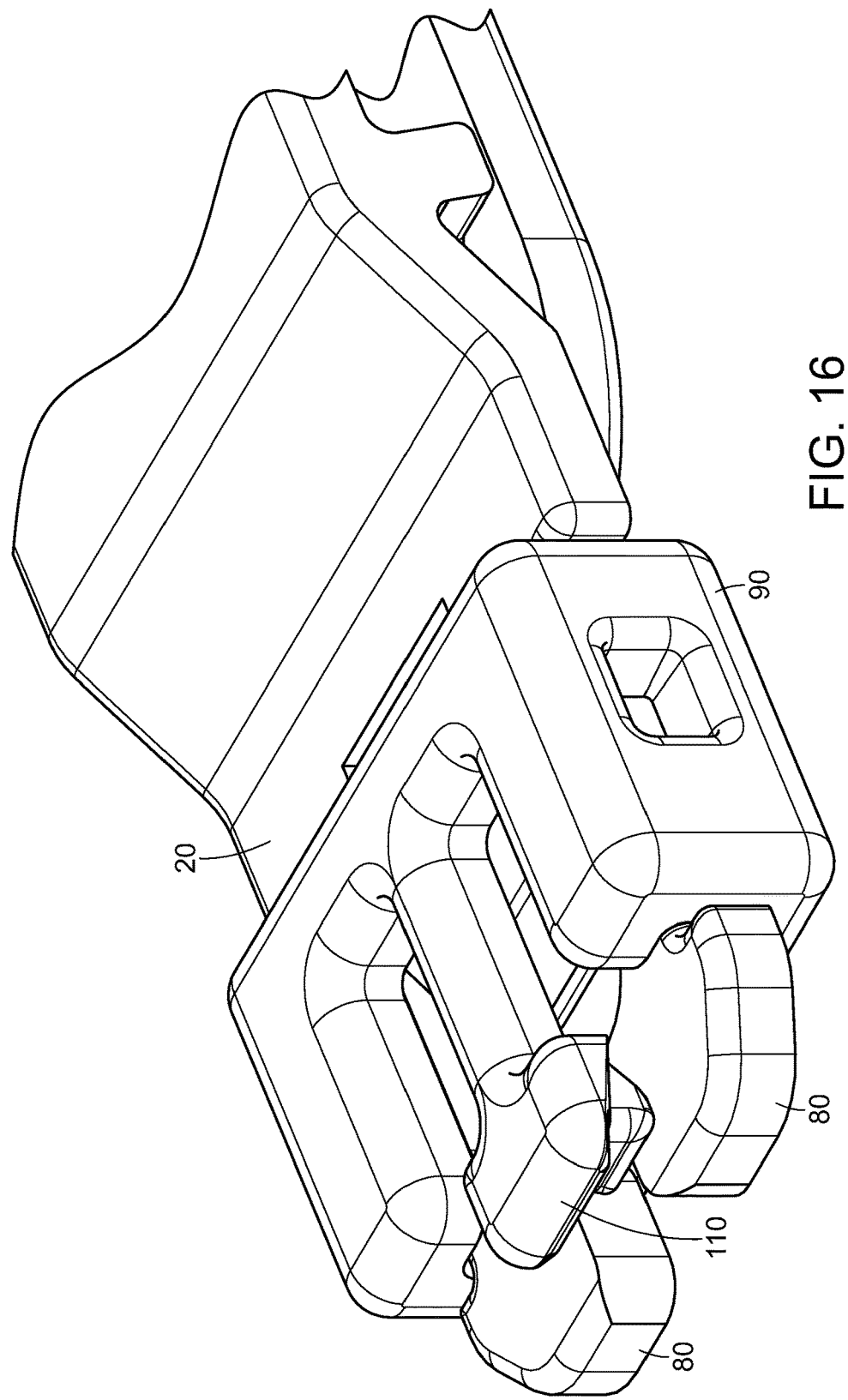
FIG. 16 is a top perspective view of the clip portion and locking collar portion engaged in a locked position with the locking collar prominent.
Figure 17:
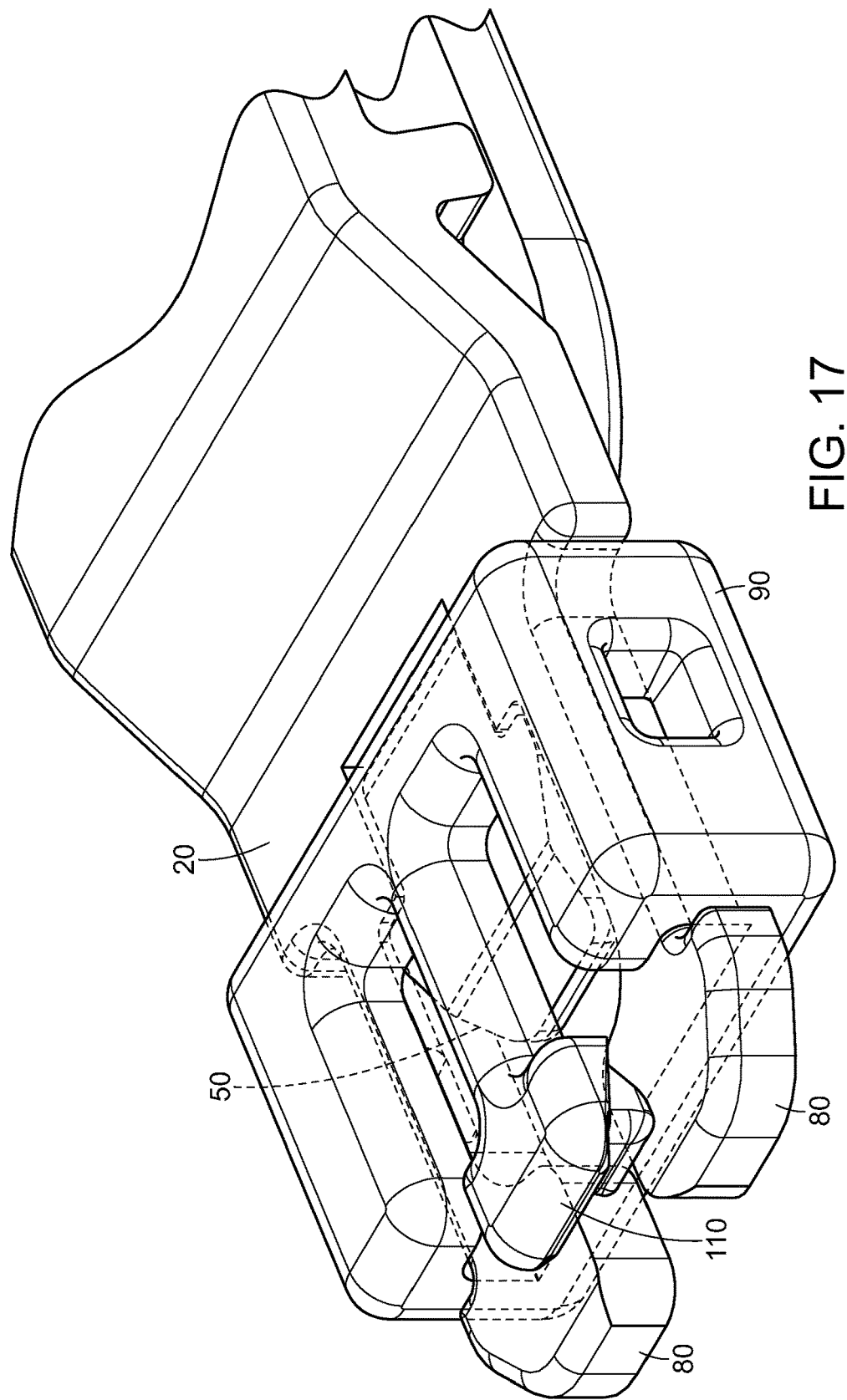
FIG. 17 is a top perspective view of the clip portion and locking collar portion engaged in a locked position with the clip portion prominent.

More specifically shown in FIGS. 15-17, the locking collar 90 is slidably mounted over the plurality of longitudinal slats 40. This is an action that can easily be taken with one hand. The pivotable locking member 110 extends outwards from the upper portion of the locking collar 90 and inwards into the passageway 100. The upper and lower portions of the locking collar 90 slide along the longitudinal slats 40 of the lower leg and the locking members 80 fit in the apertures on the right and left side of the locking collar to form a first open position wherein the tab 50 is not inserted into the locking collar 90, such that the upper leg 20 may be moved away from the lower leg 30 to engage an article to be secured or sandwiched therebetween. The locking collar slides further along the longitudinal slats 40 to a second closed position with the tab 50 extending from the upper leg 30 into the passageway 100 of the locking collar 90 such that the tab 50 extending from the upper leg rests against the pivotable locking member 110 thereby preventing movement of the upper leg 20 away from the lower leg 30. The locking members 80 of the clip portion pass all the way through the locking collar and coordinate to lock the collar 90 from reverse movement along the longitudinal slats 40 of the lower leg 30. Further, the locking members 80 prevent the locking collar 90 from being removed from the longitudinal slats 40 when in the open position, which keeps the locking collar from being lost during opening and closing of the clip.

Figure 18:
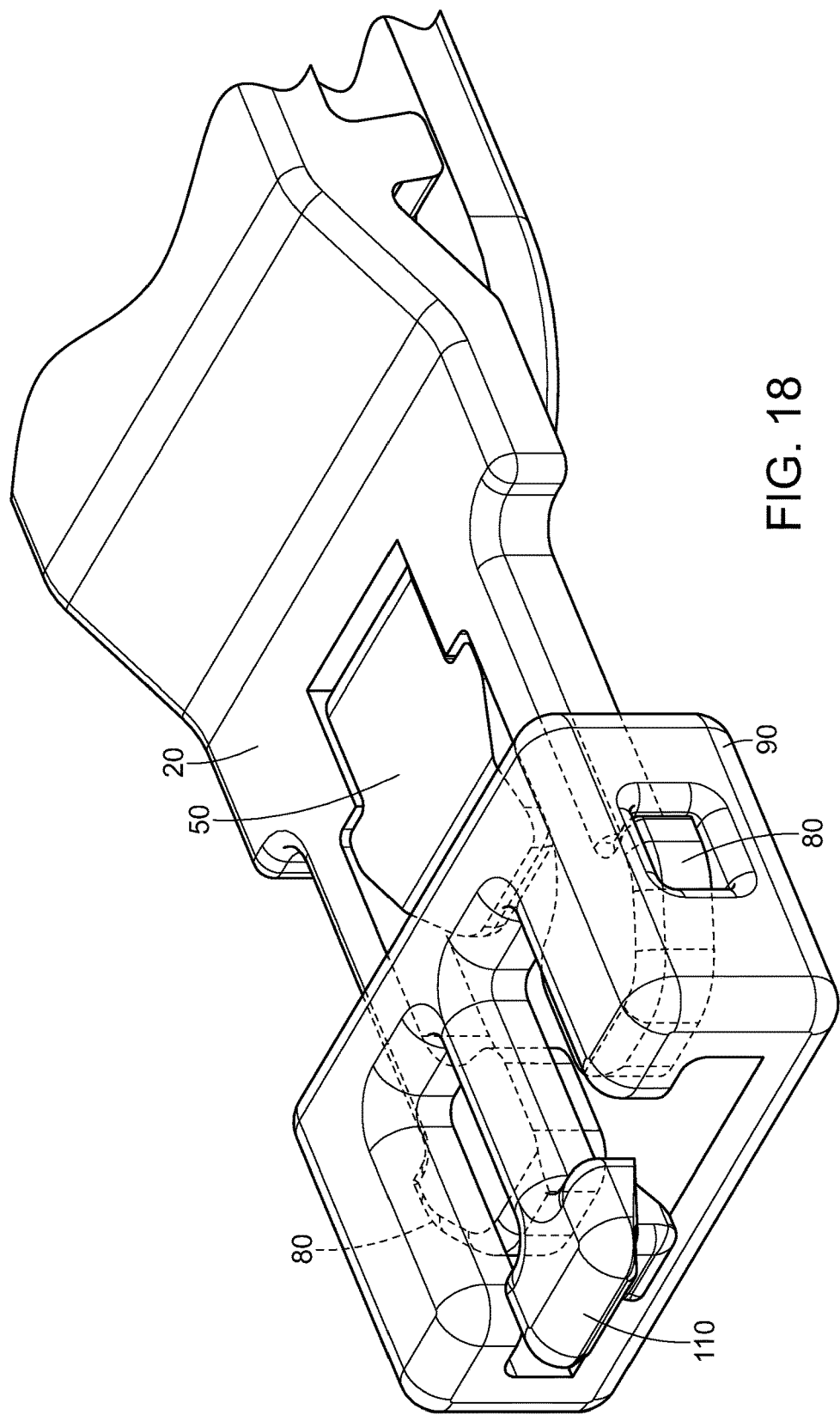
FIG. 18 is a top perspective view of the clip portion and locking collar portion moving towards an unlocked position with the clip portion prominent.

FIG. 18 shows the locking collar 90 as it is slid along the longitudinal slats 40 when the pivotable locking member 110 is raised to release the locking members 80. Once tab 50 is no longer in the locking collar passageway 100 shown in various other views, the upper leg 20 may be moved away from the lower leg 30.

For the purposes of promoting an understanding of the principles of the invention, reference has been made to the preferred embodiments illustrated in the drawings, and specific language has been used to describe these embodiments. However, this specific language intends no limitation of the scope of the invention, and the invention should be construed to encompass all embodiments that would normally occur to one of ordinary skill in the art. The particular implementations shown and described herein are illustrative examples of the invention and are not intended to otherwise limit the scope of the invention in any way. For the sake of brevity, conventional aspects of the method (and components of the individual operating components of the method) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections might be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. A belt clip comprising:
  a. a central bend portion having opposite spaced apart ends;
  b. a first leg and a second leg connected to the opposite spaced apart ends of the central bend portion and extending in a generally parallel relationship therefrom;
  c. a rigid tab portion extending longitudinally from the first leg;
  d. a pair of longitudinal slats with terminal ends extending longitudinally from the second leg with locking members protruding at the terminal ends of the slats wherein the locking members are wider than the slats;
  e. a locking collar member with an upper and lower portion defining a passageway; and
  f. a pivotable locking member extending outwards from the upper portion of the locking collar member and into the passageway;
  wherein the locking collar member is slidably mounted over the pair of longitudinal slats;
  wherein the upper and lower portions of the locking collar member slide along the longitudinal slats of the second leg to form a first open position such that the first leg may be moved away from the second leg; and
  wherein the upper and lower portion of the locking collar member slide along the longitudinal slats of the second leg and the rigid tab portion of the first leg rests against the inside of the passageway to form a second closed position such that the first leg is biased towards the second leg.

2. The clip of claim 1 wherein the central bend portion comprises a semi-flexible tear drop shaped member.

3. The clip of claim 2 wherein the first and second legs are rigid or semi-rigid.

4. The clip of claim 1 wherein the locking collar member further comprises apertures on a left and right side of the locking collar member.

5. The clip of claim 4 wherein the locking members of the longitudinal slats rest within the left and right side apertures of the locking collar member and coordinate to prevent the locking collar member from reverse movement along the longitudinal slats of the second leg in the first open position.

6. , The clip of claim 4 wherein the locking members of the longitudinal slats extend through the locking collar member and coordinate to lock the locking collar member from reverse movement along the longitudinal slats of the second leg in the second closed position.

7. The clip of claim 1 wherein the bend portion, the first leg and the second leg are formed as one continuous length of material.

8. The clip of claim 1 wherein the first and second leg grip a belt placed there between to prevent lateral or vertical movement.

9. The clip of claim 1 further comprising at least one mounting aperture through the first leg.

10. The clip of claim 1 further comprising at least one mounting aperture through the second leg.

11. The clip of claim 9 wherein a piece of modular lightweight, load-carry equipment is attachable through the aperture on the first leg.

12. The clip of claim 10 wherein a piece of modular lightweight, load-carry equipment is attachable through the aperture on the second leg.

* * * * *